United States Patent [19]

Driear

[11] Patent Number: 5,165,512
[45] Date of Patent: Nov. 24, 1992

[54] MECHANISM FOR RAISING AND LOWERING AN INCLINED PORTABLE CONVEYOR

[75] Inventor: Joseph R. Driear, Thiensville, Wis.

[73] Assignee: Robert D. Sawyer, Oak Creek, Wis.

[21] Appl. No.: 787,636

[22] Filed: Nov. 4, 1991

[51] Int. Cl.$^5$ .............................................. B65G 41/00
[52] U.S. Cl. .................................. 198/318; 198/861.5
[58] Field of Search .................. 198/318, 861.5, 860.1, 198/861.1

[56] References Cited

U.S. PATENT DOCUMENTS

| | | | |
|---|---|---|---|
| 1,530,564 | 2/1925 | Lemmon | 198/318 X |
| 2,519,478 | 8/1950 | King | 198/318 X |
| 4,526,265 | 7/1985 | Enns | 198/318 |
| 4,739,868 | 4/1988 | Head | 198/861.5 X |
| 4,955,955 | 9/1990 | Driear | 198/318 |

FOREIGN PATENT DOCUMENTS

| | | | |
|---|---|---|---|
| 202445 | 9/1955 | Australia | 198/318 |
| 210995 | 6/1957 | Australia | 198/318 |
| 550466 | 9/1956 | Belgium | 198/318 |
| 688128 | 1/1940 | Fed. Rep. of Germany | 198/318 |
| 235683 | 12/1944 | Switzerland | 198/318 |
| 570034 | 7/1944 | United Kingdom | 198/318 |

Primary Examiner—D. Glenn Dayoan
Attorney, Agent, or Firm—Andrus, Sceales, Starke & Sawall

[57] ABSTRACT

A portable conveyor having a pair of rear wheels which support the lower end of the conveyor and a pair of caster wheels are spaced forwardly from the rear wheels and are carried by a horizontal axle. An adjustable linkage interconnects the axle and the conveyor and a drive mechanism is operably connected to the linkage and acts to vary the angularity of the linkage and thus change the inclination of the conveyor. The drive mechanism includes a lead screw which is threaded to a nut that is operably connected to the conveyor. The lead screw carries a worm gear which is engaged with a worm that is journalled for rotation in a thrust bar housing attached to the linkage. A driven shaft is connected to the worm and is constructed to be connected to the drive shaft of a reversible, power-operated hand drill. Operation of the high speed drill acting through the worm gear and screw system will rapidly raise and lower the conveyor.

10 Claims, 2 Drawing Sheets

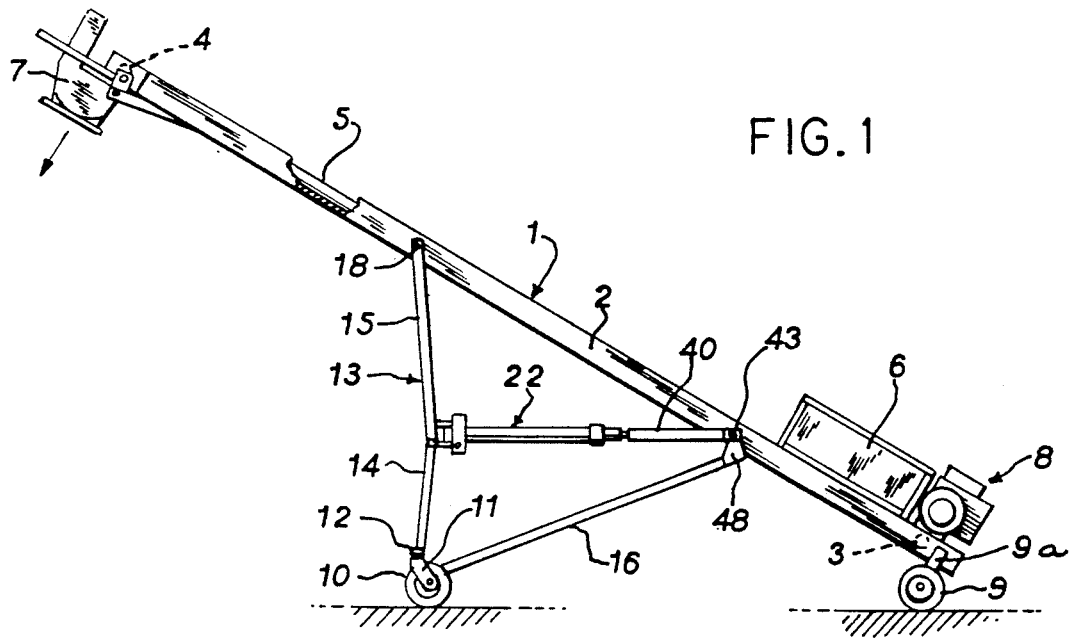
FIG. 1
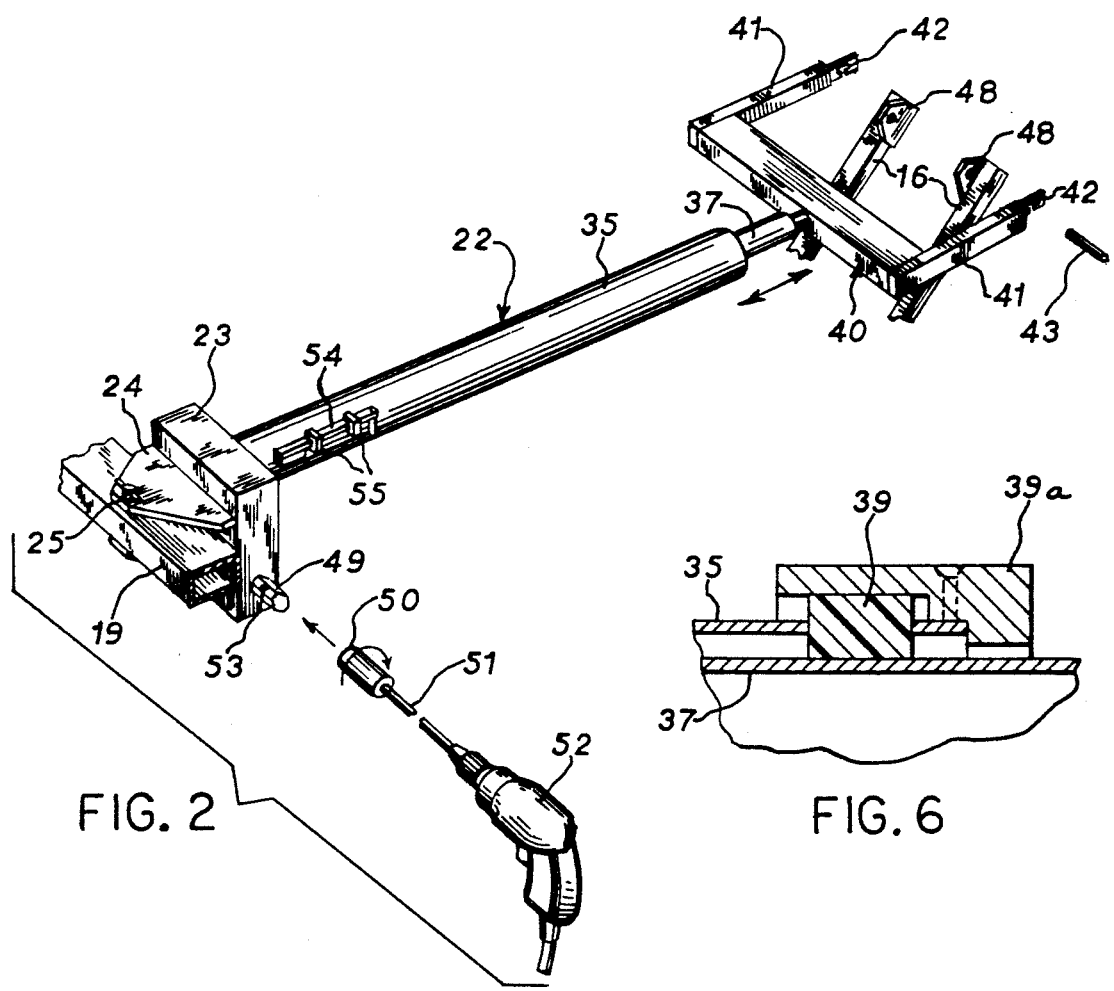
FIG. 2
FIG. 6

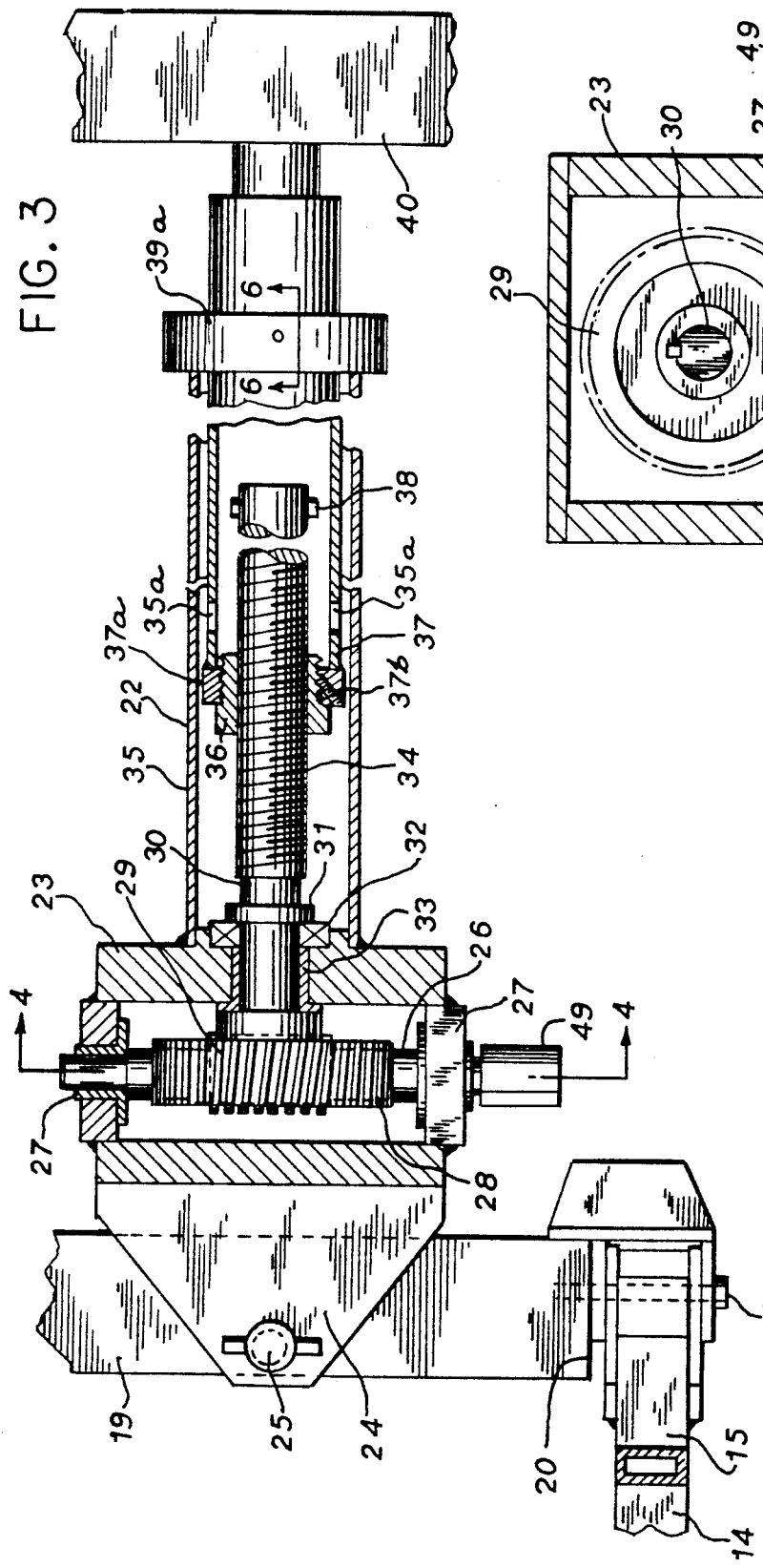
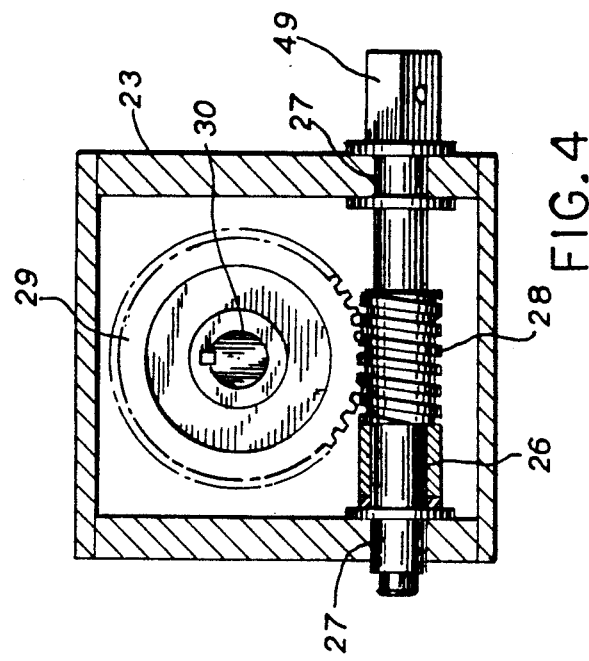
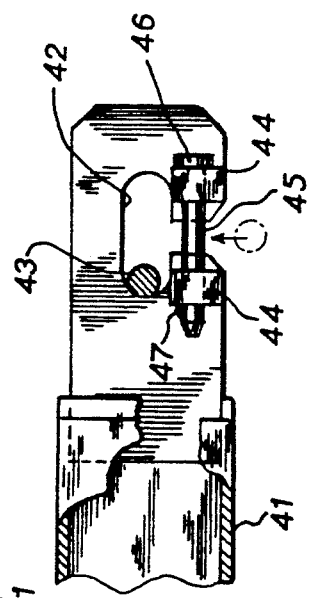

MECHANISM FOR RAISING AND LOWERING AN INCLINED PORTABLE CONVEYOR

BACKGROUND OF THE INVENTION

Portable conveyors are used for conveying bulk material, such as sand, gravel, concrete and the like. The typical portable conveyor includes an endless belt conveyor that is usually located at an inclined angle. The bulk material is fed to the lower end of the inclined conveyor and is discharged from the upper end through a hopper to a location of use.

To enable the conveyor to be readily moved between different locations on a given site, the conveyor is mounted on wheels. In the typical installation, a pair of rear wheels are located at the lower end of the conveyor, while a pair of caster wheels are supported from a horizontal axle through vertical pivot shafts and are located beneath the central portion of the conveyor.

To vary the angle of inclination of the conventional conveyor, a pair of rear arms connect the axle to the rear or lower end of the conveyor, while a pair of forward arms connect the axle to the forward or upper end of the conveyor. A cable mechanism is commonly employed to pivot the forward arms relative to the rear arms to thereby change the angle of inclination of the conveyor.

U.S. Pat. No. 4,955,955 discloses an improved mechanism for raising and lower the conveyor. In accordance with the aforementioned patent application, an adjustable linkage interconnects the axle and the conveyor. The linkage includes a pair of tie bars that interconnect the caster wheel axle and the lower portion of the conveyor, and the linkage also includes a pair of upper struts and a pair of lower struts. The lower ends of the lower struts are connected to the axle, while the upper ends of the upper struts are pivotally connected to the conveyor, and the adjacent ends of the struts are interconnected by a drive mechanism which takes the form of a threaded nut and lead screw. Operation of a hand crank operating through a set of bevel gears will rotate the lead screw mechanism to raise and lower the conveyor.

It is often desirable to be able to rapidly change the inclination of the conveyor at a construction site. However, it has been found that if the drive mechanism is designed so that it can be readily rotated through use of a manual hand crank without substantial effort, it requires a great number of time consuming revolutions of the hand crank to change the elevation. Conversely, if the drive mechanism is designed to more rapidly change the inclination, manual rotation of the hand crank can be extremely difficult.

SUMMARY OF THE INVENTION

The invention is directed to an improved mechanism for raising and lowering an inclined portable conveyor. A pair of rear wheels support the lower end of the conveyor, while a pair of caster wheels are spaced forwardly from the rear wheels and are located beneath the central portion of the conveyor. The caster wheels are mounted for rotation on a horizontal axle about vertical axes.

An adjustable linkage interconnects the axle and the conveyor. The linkage includes a pair of tie bars of fixed length that interconnect the caster wheel axle and the lower end portion of the conveyor. In addition, the linkage includes a pair of upper struts and a pair of lower struts. The lower ends of the lower struts are pivotally connected to the axle, while the upper ends of the upper struts are pivotally connected to the conveyor, and the adjacent end of the struts are interconnected by a drive mechanism.

In accordance with the invention, the drive mechanism includes a lead screw which is threaded to a nut that is connected through a sleeve to the conveyor. The opposite end of the lead screw carries a worm gear which is engaged with a worm that is mounted for rotation in a housing which in turn is attached to a thrust bar that interconnects the adjacent ends of the struts. A driven shaft is connected to the worm and has a polygonal-shaped outer head, which is engaged by a polygonal socket of a standard, reversible, power-operated, drill. The drill is preferably a two-speed type which will normally have a low speed of about 500 rpm and a high speed of about 1000 rpm. At these speeds, the worm can be rapidly rotated to enable the conveyor to be raised or lowered at a rapid rate with little manual effort. It is preferred that the hand drill be a rechargeable type, so that the drill can be used to raise and lower the conveyor at construction sites which are without electrical power.

The use of the worm gear in conjunction with the lead screw and nut provides a self-locking system which will prevent free fall of the conveyor, even if the conveyor is loaded with heavy materials, such as concrete, gravel, or the like.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of a portable conveyor;

FIG. 2 is a perspective view of the drive mechanism;

FIG. 3 is a longitudinal section of the drive mechanism;

FIG. 4 is a section taken along line 4—4 of FIG. 3;

FIG. 5 is an enlarged fragmentary elevational view showing the attachment of the drive mechanism to the conveyor and;

FIG. 6 is a section taken along line 6—6 of FIG. 3.

DESCRIPTION OF THE ILLUSTRATED EMBODIMENT

FIG. 1 illustrates a portable, inclined conveyor, which has particular use in conveying bulk materials, such as concrete, sand, gravel, and the like.

The conveyor includes a frame 1 having a pair of side plates 2, and a drive roll 3 and idler roll 4 are journaled for rotation between side plates 2 at opposite ends of the conveyor. An endless conveyor belt 5 is trained over the rollers 3 and 4.

In use, the conveyor is usually at an inclined angle and drive roll 3 is located at the lower end of frame 1, while the idler roll 4 is at the upper end of the frame. The material to be conveyed is fed onto the lower end of belt 5 through a feed hopper 6, and the material is discharged from the belt through a discharge hopper 7 mounted on the upper end of frame 1.

A drive mechanism 8, which can take the form of a gasoline engine, is mounted on the lower end of the frame and is operably connected to drive roller 3 through a suitable transmission.

To provide mobility for the conveyor, a pair of rear wheels 9 are located at the lower end of the frame and are journaled on the ends of an axle that is supported from the frame through a pair of axle supports 9a. In addition to wheels 9, the conveyor also includes a pair of caster wheels 10, that are located forwardly of rear wheels 9 and are positioned beneath the central portion of conveyor frame 1. Each caster wheel 10 is journaled for rotation on a yoke 11 and the upper end of each yoke is mounted for rotation on a horizontal axle 12. This construction enable the caster wheels to rotate about their axes, as well as rotating 360° around the axes of the yokes 11.

A linkage 13 connects axle 12 with conveyor frame 1. Linkage 13 is composed of a pair of lower struts 14, the lower ends of which are pivotally connected to axle 12, a pair of upper struts 15, the upper ends of which are pivotally connected to conveyor frame 1, and a pair of tie bars 16 which are interconnected between axle 12 and conveyor frame 1.

The lower ends of struts 14 and tie bars 16 can be connected to axle 12 by a mechanism as described in U.S. Pat. No. 4,955,955 which will maintain the axes of yokes 12 in a vertical attitude, as the conveyor is raised and lowered. The construction of the aforementioned patent application is incorporated herein by reference.

The upper ends of upper struts 15 are pivotally connected to frame 1 via a rod 18 that extends transversely between the side plates of the frame, while the lower ends of upper struts 15 and the upper ends of lower struts 14 are pivotally connected to a thrust bar 19. As best shown in FIG. 3, thrust bar 19 is generally rectangular in cross section and the ends of the thrust bar are provided with pockets 20. The adjacent ends of struts 14 and 15 are pivotally connected within pockets 20 by pivot shafts 21.

In accordance with the invention, a drive mechanism 22 connects the thrust bar 19 with conveyor frame 1. Drive mechanism 22 includes a generally rectangular gear housing 23 having a pair of parallel spaced ears 24, which are located on either side of thrust bar 19. Ears 24 are connected to thrust bar 19 by a vertical pin 25 which extends through aligned openings in ears 24 and bar 19.

A shaft 26 is mounted for rotation in housing 23 and the ends of shaft 26 are journaled for rotation in bearings 27, which are mounted within aligned openings in the walls of the housing. Mounted on the central portion of shaft 26 is a worm 28, which is engaged by a worm gear carried by a shaft 30, and the outer portion of shaft 30, located outwardly of housing 23, carries a collar 31 which engages a thrust bearing 32 mounted within a recess in the wall of housing 23. A radial bearing 33 journals the shaft 30 for rotation in the housing wall.

The outer portion of shaft 30 is threaded and constitutes a lead screw 34 which is spaced within an outer tubular housing 35. Screw 34 is threaded with a nut 36 that is connected to a sleeve 37. Nut 36 is preferably composed of a different metal, such as bronze, than the screw. Sleeve 37 is connected to nut 36, preferably in a fashion such as threading which permits exchanging the nut when wear occurs. As seen in FIG. 3, nut 36 is threaded in an opening in the end plate 37a of sleeve 37 and is locked to the end plate by lock screw 37b. The outer end of the sleeve projects outwardly beyond the corresponding end of the housing. To prevent complete displacement of screw 34 from nut 36, a stop pin 38 is secured to the end of the lead screw. Diametrically opposed clearance holes 35a are provided in tubular housing 35 to permit installation or removal of pin 38.

As shown in FIG. 6, three wear pads 39 formed of a material having a low coefficient of friction, such as polyethylene, are mounted in holes that are spaced equidistant around the outer end of housing 35. Retaining ring 39a, which is secured to the end of housing 35 by suitable screws, keeps the pads in contact with outside of sleeve 37 and serve to center sleeve 37 with respect to housing 35 and permit the sleeve to move axially without undue resistance or friction. Pads 39 provide additional support to prevent buckling of the column formed by screw 34 and sleeve 37 in the event of an accidental compressive overload.

The outer end of sleeve 37 is connected to a yoke 40, as shown in FIG. 2. Yoke 40 includes a pair of parallel arms 41 and the end of each arm is formed with a downwardly facing T-slot 42. T-slots 42 are adapted to engage a rod 43 which extends transversely between and through side plates 2 of conveyor frame 1. Rod 43 is located between the upper and lower runs of conveyor belt 5.

After the T-slots are engaged with rod 43, the weight of the conveyor will cause the rod to be located in the inner end of the T-slot, as shown in FIG. 5, thus providing a positive connection between the yoke 40 and the conveyor frame 1.

To prevent accidental displacement of the rod from the T-slots 42, arms 41 are provided with enlargements 44 bordering the entry to each slot 42 and the enlargements 44 are formed with aligned holes which receive a locking pin 45. One end of pin 45 is provided with an enlarged head 46 that engages one of the enlargements 44, as seen in FIG. 5, while a spring loaded detente ball 47 is located in the opposite or distal end of the pin and prevents free displacement of the pin from the holes in the enlargements.

As shown in FIG. 2, the upper end of each tie bar 16 carries a bracket 48 and rod 43 extends through holes in brackets 48 to pivotally connect the tie bars to the conveyor frame. Brackets 48 are located inboard of the respective arms 41 of yoke 40.

To operate lead screw 34, the projecting end of shaft 26 is provided with a hex-head 49, which is engaged by a hex-socket 50 on a modified extension bar 51 chucked into a standard, reversible, rechargeable, electrical hand drill 52. The hex-head 49 is fitted with a spring loaded detent ball 53 which engages a circumferential groove formed on the inside of the socket and tends to hold the socket in proper position for driving on hexhead 49, but permits the socket to be readily removed from the hex head. Drill 52 is preferably a multiple speed type, and in practice the drill may have a low speed of approximately 350 rpm and a high speed of approximately 1000 rpm. Operation of the high speed drill 52 acting through the worm gear and lead screw system, will act to rapidly raise and lower the conveyor.

The conveyor is normally designed to be moved through an angle of approximately 30°, and with the use of the hand drill 52, the conveyor can be moved between its "full down" and "full up" positions in a period less than 1.75 minutes, while movement from full down to a usual delivering height of approximately 8 feet takes about 15 seconds. This is a substantial advantage over prior portable conveyors, which require a considerably longer period of time to manually raise and lower the conveyor. Thus, the invention not only enables the inclination of the conveyor to be more rapidly changed at the construction site, but also eliminates the tedious manual cranking effort, as required in the past.

As a further advantage, the worm gear and screw system is self-locking and will not back off due to the weight of the load on the conveyor.

While it is preferred to employ a rechargeable electric drill 52, due to the fact that many construction sites do not have electrical power, it is contemplated that a non-rechargeable drill that can be connected to a suitable source of power can also be utilized.

As shown in FIG. 2, the conveyor can also include a folded hand crank 54, which is attached to the housing 35 through suitable clamps 55. In the event a drill is not available for use, the hand crank 54 can be employed in an emergency to raise and lower the conveyor.

Various modes of carrying out the invention are contemplated as being within the scope of the following claims particularly pointing out and distinctly claiming the subject matter which is regarded as the invention.

I claim:

1. An improved mechanism for raising and lowering an inclined portable conveyor, comprising a conveyor to convey a bulk material and having a lower end and an upper end, wheel means for supporting the conveyor for movement, an adjustable linkage means pivotally interconnecting said wheel means and said conveyor, and drive means operably connected to said linkage for adjusting the angularity of said linkage to thereby vary the inclination of said conveyor, said drive means including a screw member, a nut member engaged with said screw member, a first of said members being operably connected to said conveyor, a worm gear connected to a second of said members, a worm engaged with said worm gear and including a driven shaft, and coupling means for coupling a power operated, reversible hand drill to said driven shaft to thereby drive said worm and raise and lower said conveyor.

2. The mechanism of claim 1, wherein said coupling means comprises a non-circular connector to be engaged by a complimentary non-circular connector on said drill.

3. The mechanism is of claim 1, wherein said first member is a nut and said second member is a lead screw.

4. The mechanism of claim 1, wherein said linkage includes first strut means having a first end pivotally connected to said wheel means and having a second end, second strut means having a first end pivotally connected to said conveyor and having a second end, and connecting means for pivotally interconnecting the second ends of said first and second strut means, said drive means being operably connected to said connecting means.

5. The mechanism of claim 4, and including a tie bar interconnecting said wheel means and said conveyor at a location adjacent the pivotal connection of said drive means with said conveyor.

6. The mechanism of claim 5, and including second wheel means for supporting the lower end of said conveyor for travel.

7. An improved mechanism for raising and lowering a portable inclined conveyor, comprising a conveyor to convey a material, first wheel means to support the lower end of the conveyor, caster wheel means spaced from said first wheel means and disposed beneath said conveyor, said caster wheel means including a horizontal axle, an adjustable linkage interconnecting said axle and said conveyor, and drive means operably interconnecting said linkage and said conveyor for adjusting the angularity of said linkage to thereby vary the elevation of said conveyor, said drive means including a lead screw, a nut engaged with said lead screw and operably connected to said conveyor, a worm gear connected to said lead screw, a worm engaged with said worm gear and including a driven shaft, first coupling means on said driven shaft, a reversible battery-operated hand drill having a drive shaft, and second coupling means mounted on said drive shaft and engaged with said first coupling means, operation of said drill acting through said worm gear and said lead screw to raise and lower said conveyor.

8. The mechanism of claim 7, wherein said adjustable linkage comprises first strut means having a first end pivotally connected to said axle and having a second end, second strut means having a first end pivotally connected to said conveyor and having a second end, and thrust bar connecting means pivotally interconnecting the second ends of said first and second strut means, said drive means being operably connected to said connecting means.

9. The mechanism of claim 8, wherein said drive means includes a housing to house said worm and said worm gear, said housing being connected to said connecting means.

10. An improved mechanism for raising and lowering a portable inclined conveyor, comprising a conveyor to convey a material, first wheel means to support the lower end of the conveyor, caster wheel means spaced from said first wheel means and disposed beneath said conveyor, said caster wheel means including a horizontal axle, first strut means having a first end pivotally connected to said axle and having a second end, second strut means having a first end pivotally connected to said conveyor and having a second end, thrust means pivotally interconnecting the second ends of said struts, and drive means interconnecting said thrust means and said conveyor, said drive means comprising a lead screw, a nut engaged with said lead screw and operably connected to said conveyor, a worm gear connected to said lead screw, a worm engaged with said worm gear and mounted for rotation relative to said thrust means, a driven shaft connected to said worm, first, coupling means on said driven shaft, a reversible rechargeable power-operated hand drill having a drive shaft, and second coupling means mounted on said drive shaft and engaged with said first coupling means, operation of said drill acting through said worm gear and said lead screw to raise and lower said conveyor.

* * * * *